United States Patent
Ge et al.

(10) Patent No.: US 8,674,621 B2
(45) Date of Patent: Mar. 18, 2014

(54) CONSTANT CURRENT CONTROL CIRCUIT WITH MULTIPLE OUTPUTS FOR LED DRIVER

(75) Inventors: Liangan Ge, Zhejiang (CN); Guichao Hua, Zhejiang (CN); Xiaoli Yao, Zhejiang (CN); Xinke Wu, Zhejiang (CN)

(73) Assignee: Inventronics (Hangzhou), Inc., Hangzhou (CN)

( * ) Notice: Subject to any disclaimer, the term of this patent is extended or adjusted under 35 U.S.C. 154(b) by 144 days.

(21) Appl. No.: 12/896,445

(22) Filed: Oct. 1, 2010

(65) Prior Publication Data

US 2011/0080115 A1    Apr. 7, 2011

(30) Foreign Application Priority Data

Oct. 1, 2009    (CN) .......................... 2009 1 0153405

(51) Int. Cl.
*H05B 37/02* (2006.01)
*H05B 41/36* (2006.01)

(52) U.S. Cl.
USPC ........... 315/294; 315/291; 315/297; 315/312; 315/209 R (58) Field of Classification Search
USPC ............ 315/291, 209 R, 294, 297, 307, 312, 315/185 R
See application file for complete search history.

(56) References Cited

U.S. PATENT DOCUMENTS

| | | | |
|---|---|---|---|
| 2008/0303452 A1* | 12/2008 | Van Erp | 315/294 |
| 2009/0187925 A1* | 7/2009 | Hu et al. | 719/327 |
| 2010/0164403 A1* | 7/2010 | Liu | 315/297 |

* cited by examiner

*Primary Examiner* — Douglas W Owens
*Assistant Examiner* — Jonathan Cooper
(74) *Attorney, Agent, or Firm* — Terry M. Sanks, Esq.; Beusse Wolter Sanks Mora & Maire, P.A.

(57) ABSTRACT

A constant current control circuit with multiple outputs for a LED driver, the circuit including a single-output constant current power supply, and multiple output circuits, each output circuit comprising a current sharing circuit, a current sharing control circuit and a LED load. The LED load and the current sharing circuit are in series and form a series loop with a first terminal and a second terminal of the series loop connected to a first output terminal and a second output terminal of the constant current power supply.

10 Claims, 6 Drawing Sheets

Figure 9

CONSTANT CURRENT CONTROL CIRCUIT WITH MULTIPLE OUTPUTS FOR LED DRIVER

CROSS-REFERENCE TO RELATED APPLICATIONS

This application claims priority to Chinese Patent Application No. 200910153405.8 filed Oct. 1, 2009, which is incorporated herein by reference.

BACKGROUND OF THE INVENTION

Exemplary embodiments of the present invention generally relate to a driver for a light emitting diode (LED), and, more specifically, to a current sharing technology for multiple outputs of LEDs in paralleled.

Figure 1:
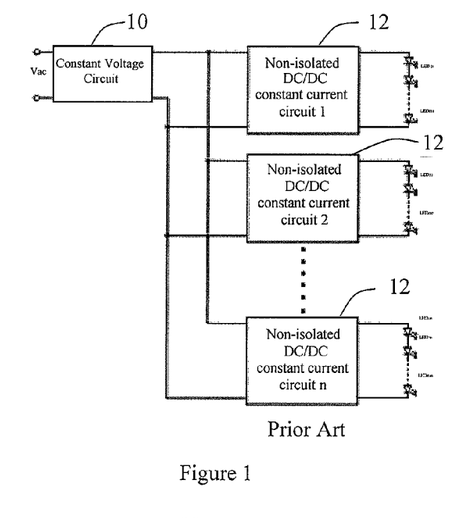
FIG. 1 depicts a block diagram illustrating a circuit as used in the prior art.

For constant current control technology for multiple outputs, there are several traditional prior art techniques/methods which are used frequently. As illustrated in FIG. 1, a constant voltage circuit with multiple non-isolated DC/DC constant current circuit (e.g., Buck circuit) is disclosed, while another approach, as illustrated in FIG. 2, involves a voltage regulated circuit with adjustable output voltage connected with multiple linear regulation constant current circuit.

As further illustrated in FIG. 1, an output voltage of a constant voltage circuit 10 is an input for a constant current circuit 12 with multiple outputs. Each constant current circuit 12 is independently controlled, making it relatively easy to guarantee the current sharing for multiple outputs. A key disadvantage of such a circuit is that it is a complex circuit causing the cost to build such a circuit to be rather expensive because each constant current circuit 12 requires an independent a DC/DC converter.

Figure 2:
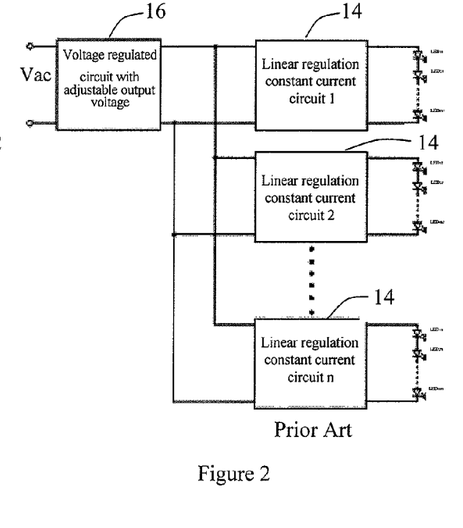
FIG. 2 depicts another block diagram illustrating a circuit as used in the prior art.

As further illustrated in FIG. 2, a multiple linear regulation constant current control circuit is disclosed. Though not illustrated, each linear regulation constant current control circuit 14 comprises a MOSFET and transistors. An output voltage of a voltage regulated circuit 16 of a first stage is adaptively changed with an output of the linear regulator of a post stage. An output voltage of the first stage is always higher than a maximum output voltage of the multiple linear regulated constant current circuits, resulting in minimum power loss. An advantage of this prior art circuit is the low cost and the good current sharing capability for multiple outputs. However, a disadvantage is that the voltage controlled circuit of the first stage is not standard, but it is custom-built where the design cost is high. To ensure proper safety features are included, additional higher cost are further realized because the first stage circuit is not a standard circuit.

BRIEF DESCRIPTION OF THE INVENTION

The present invention intends to solve the drawbacks of the prior art by providing a simple circuit which and implements the good, and/or cost effective, current sharing technology for LED drivers with multiple outputs. A constant current control circuit with multiple outputs for a LED driver, the circuit comprises a single-output constant current power supply, and multiple output circuits, each output circuit comprising a current sharing circuit, a current sharing control circuit and a LED load. The LED load and the current sharing circuit are in series and form a series loop with a first terminal and a second terminal of the series loop connected to a first output terminal and a second output terminal of the constant current power supply.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE INVENTION

Figure 3:
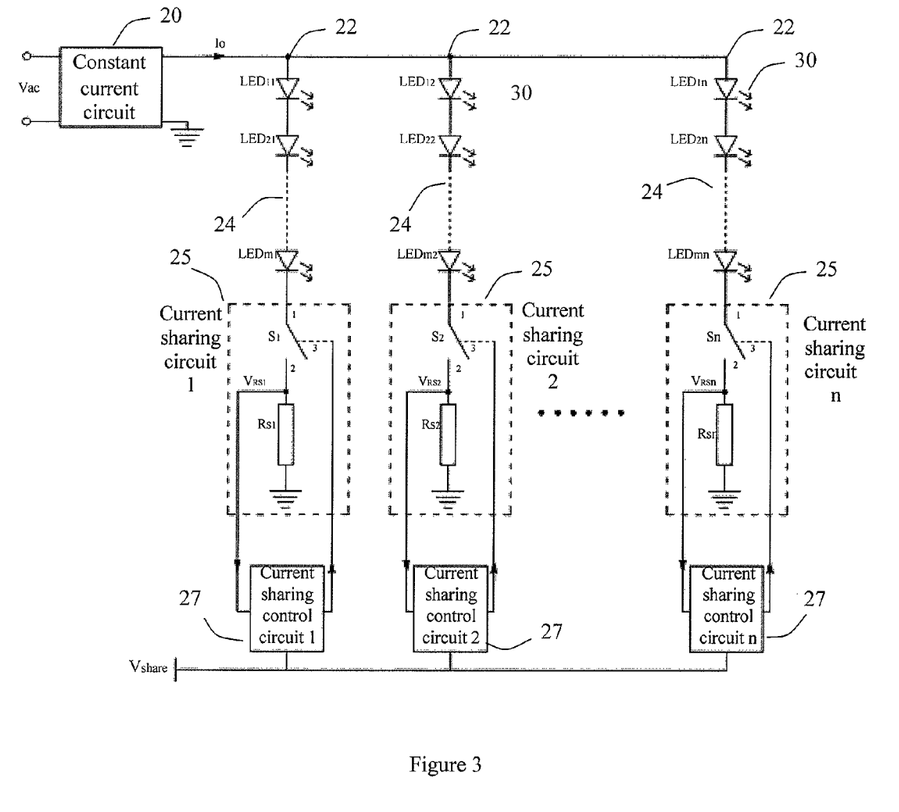
FIG. 3 depicts a diagram illustrating an exemplary embodiment of a circuit diagram of constant current control circuit with multiple outputs for led driver with a current sharing control circuit represented as a block as used in a block diagram.

FIG. 3 depicts a diagram illustrating an exemplary embodiment of a circuit diagram of constant current control circuit with multiple outputs for led driver with a current sharing control circuit represented as a block as used in a block diagram. To solve the aforesaid drawbacks of the prior art as described above, exemplary embodiments of the present invention adopt a constant current control circuit 20 with multiple outputs 22 applicable for a LED driver where each multiple output comprises a single-output constant current power supply and multiple output circuits. Each output circuit 24 comprises a current sharing circuit 25, a current sharing control circuit 27, and an LED load 30 composed by at least one LED though usually several LED strings. As explained in further detail below, the LED load 30 and the current sharing circuit 25 are in series and constitute a series loop, and the two terminals of the series loop are connected to the two output terminals of the constant current power supply. The current sharing circuit 25 comprises a current sharing resistor Rs1 and a linear regulator S1, and its output is connected with the input terminal of the current sharing control circuit 27.

The input signal of each current sharing control circuit 27 comes from the output current sampling signal of a sampling resistor Rs1, which becomes a common terminal through the current sharing circuit 25 itself. When the common terminal is connected with other current sharing control circuits, it becomes a current sharing bus (Vshare). When each current sampling signal and the current sharing bus signal are compared and adjusted through the current sharing control circuit 27, the output signal of the corresponding current sharing control circuit 27 can control the impedance of the linear regulator accordingly, and then control the current of each output to make sure the current output by each circuit is equivalent to one another.

An advantage and benefit of exemplary embodiments of this invention lie in the structure of constant current controlled main circuit and control circuit of multiple outputs is very simple and costs low. Furthermore, the multiple outputs circuits are independently operated and do not rely on frontal single output constant current circuit. It is applicable with the post stage circuit of a standard single constant current driver. When the single output constant current circuit 20 of the front stage needs to change a current set point (such as dimming), the constant current controlled circuit 27 of multiple outputs still keeps the current sharing automatically.

The linear regulator S1 is a MOSFET or a transistor. In an exemplary embodiment, the first terminal 1 of the linear regulator S1 is connected with the output of the LED load 30, and the second terminal 2 of the linear regulator S1 is connected with one end of the sampling resistor Rs1, while the control terminal 3 of the linear regulator S1 is connected with the output terminal of the current sharing control circuit 27. The other end of the sampling resistor Rs1 is connected to the ground 32.

As disclosed below in further detail, the constant current control circuit with multiple outputs for the LED has the current sharing control circuit 27 which comprises an amplifier IC1, whose positive input terminal of the amplifier is connected with the current sharing bus and a resistor in serial, and then connected with its negative input terminal of the amplifier and the sampling terminal of sampling resistor. The output terminal of the amplifier is connected with the control terminal of the linear regulator directly or by connecting with an output resistor in series. The current sharing control circuit includes an amplifier and an N-type transistor. The positive input terminal of the amplifier is connected to the current sharing bus. After connecting in series with a resistor, it is then connected to the negative terminal of the amplifier and the sampling terminal of the sampling resistor (Rsn). The output terminal of the amplifier is in series with a resistor, and then connects with the base of the transistor. The emitter of the transistor is connected with the ground, and the collector of the transistor is connected with the control terminal of the linear regulator.

Additionally, the current sharing control circuit includes two amplifiers, three resistors) and a diode (Dn). The positive terminal of the first amplifier is connected with one end of the first resistor and the sampling terminal of the sampling resistor, while the negative terminal of the first amplifier is connected with the anode of the diode, and one terminal of the third resistor and the current sharing bus. The cathode of the diode is connected with the output terminal of the first amplifier. The other end of the first resistor is connected with the negative terminal of the second amplifier, and the positive terminal of the second amplifier is connected with one end of the second resistor and the other end of the third resistor. The other end of the second resistor is connected with the power source (VCC), and the output terminal of the second amplifier is connected with the control terminal of the linear regulator directly or by connecting with an output resistor in series.

The current sharing control circuit comprises two amplifiers, four resistors, a diode (Dn), and a transistor. The positive terminal of the first amplifier is connected with one end of the first resistor and the sampling terminal of the sampling resistor, while the negative terminal of the first amplifier is connected with the anode of the diode, and one end of the third resistor and the current sharing bus. The cathode of the diode is connected with the output terminal of the first amplifier, and the other end of the first resistor is connected with the negative terminal of the second amplifier. The positive terminal of the second amplifier is connected with one end of the second resistor and the other end of the third resistor), and the other end of the second resistor is connected with the power source (VCC). The output terminal of the second amplifier is connected with one end of the fourth resistor, and the other end of the fourth resistor is connected with the base of the transistor. The emitter of the transistor is connected to the ground, and the collector of the transistor is connected with the control terminal of the linear regulator.

Figure 4:
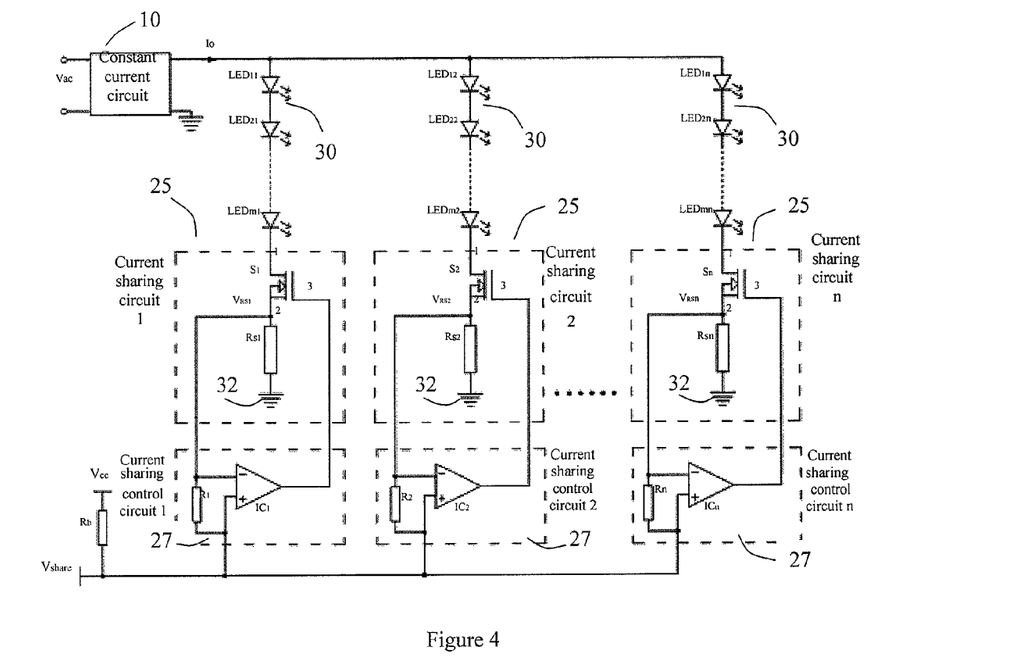
FIG. 4 depicts a diagram illustrating an exemplary embodiment of a circuit diagram of constant current control circuit with multiple outputs for led driver.

As shown in FIG. 4, the voltage Vac is the input voltage of the constant current circuit 10, and the output current of the constant current circuit (Io) feeds the current to each LED load 30. The LED load 30 is composed of multiple series LED strings with multiple outputs (namely LED11, . . . , LEDm1, . . . , LED1n, . . . , LEDmn). Meanwhile, the first output (LED11, . . . , LEDm1) is an exemplary illustration of a LED string.

The LED load (LED11, . . . , LEDm1) 30 is connected in series and then connected to the current sharing circuit 25 which is composed of a linear regulation switch S1 and sampling resistor Rs1. The first terminal 1 of linear regulation switch S1, which may be a MOSFET, of the current sharing circuit 25 is connected to the LED load 30, and the second terminal 2 of linear regulation switch S1 is connected to the sampling resistor Rs1, another terminal of the sampling resistor Rs1 is connected to the ground 32, and then connected to the output terminal of the constant current circuit 10. The current sharing control circuit 27 is composed of resistor R1 and amplifier IC1.

The inverting terminal of the amplifier IC1 of the current sharing control circuit 27 is connected to one terminal of sampling resistor Rs1, which is named as current sampling signal VRs1, and this signal is connected to one terminal of resistor R1, another terminal of resistor R1 is connected to the non-inverting terminal of the amplifier IC1. The output terminal of amplifier IC1 is connected to the third terminal 3 of linear regulation switch S1 of the current sharing circuit 25. The non-inverting terminal of amplifier IC1 is also connected to one terminal of resistor Rb, which becomes the common terminal. This common terminal is connected to that of the other outputs and becomes a current sharing bus. Another terminal of resistor Rb is connected to VCC.

The current sampling signal (VRs1, VRsn) is in series with resistor (Rs1, . . . , Rsn), and then connected to the current sharing bus, the voltage signal of current sharing bus is the average current signal of each outputs, Vshare=(VRs1+ . . . VRsn)/n, and this average current signal will compare with the current sampling signal (VRs1, . . . , VRsn) of each output. If the current of one output is smaller than the average current, the output voltage of the amplifier is high level, which makes linear regulation switch S1 saturate, when the current from the other outputs with larger output current is reduced gradually and the current of this output is increased automatically and reaches to the average current. If the current of one output is larger than average current, the output voltage of the amplifier is gradually reduced, and makes linear regulation switch S1 operating at linear mode, the current of this output will be reduced and close to the average current. If the current of one output is equal to the average current, the output voltage of the amplifier will be at a high level because of the bias of resistor Rb, and then makes linear regulation switch S1 saturate. The lower the output voltage of the LED load 30, the lower the output voltage of the amplifier IC1, the higher the voltage drop of linear regulation switch S1, and the more reduction of the current of each LED. Those skilled in the art will also recognize that the linear regulation switch S1 can be IGBT, and etc.

Figure 5:
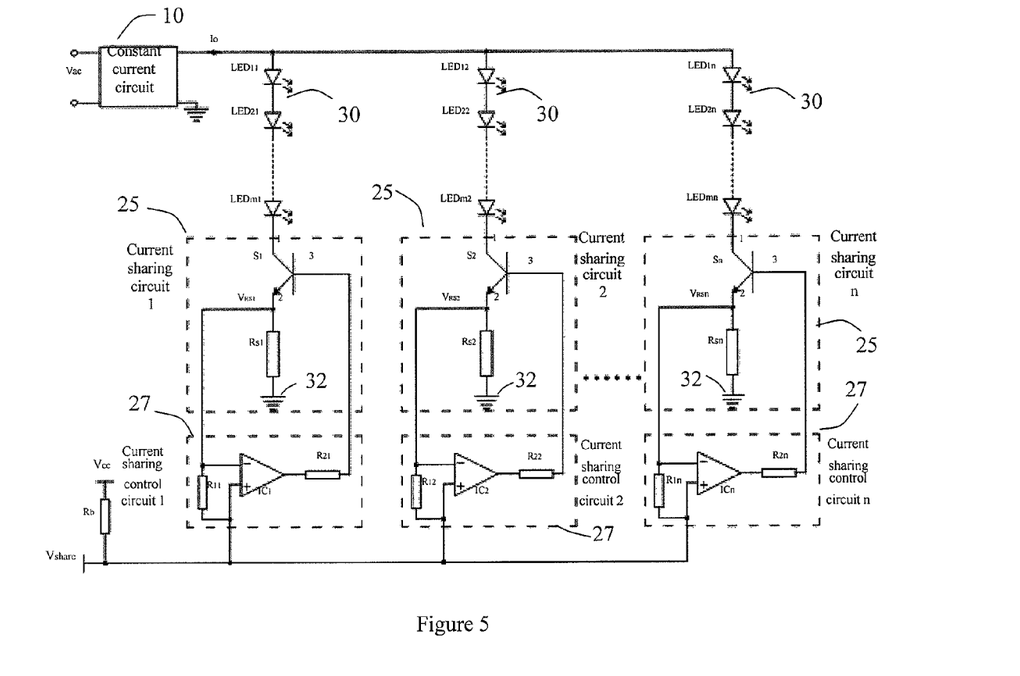
FIG. 5 depicts another diagram illustrating an exemplary embodiment of a circuit diagram of constant current control circuit with multiple outputs for led driver.

As shown in FIG. 5, the voltage Vac is the input voltage of constant current circuit 10, the output current of the constant current circuit (Io) feeds the current to each LED load 30. Each LED load 30 is composed by the multiple serial LED strings with multiple outputs (namely LED11, ..., LEDm1, LED1n, ..., LEDmn). Meanwhile, the first output (LED11, ..., LEDm1) is as an exemplary illustration.

The LED load (LED11, ..., LEDm1) is connected in series and then connected to the current sharing circuit 25 composed of the linear regulation switch S1 and the sampling resistor Rs1.

The first terminal of linear regulation switch (NPN transistor) S1 of the current sharing circuit 1 is connected to the LED load 30, and the second terminal of linear regulation switch S1 is connected to one terminal of sampling resistor Rs1, another terminal of sampling resistor Rs1 is connected to the ground 32, and then it is connected to the output terminal of the constant current circuit 10.

The current sharing control circuit 27 comprises a resistor R11, resistor R21 and amplifier IC1. The inverting terminal of the amplifier IC1 of the current sharing control circuit 27 is connected to one terminal of sampling resistor Rs1, which is named as current sampling signal VRs1, and this signal is connected to one terminal of resistor R11, another terminal of resistor R11 is connected to the non-inverting terminal of the amplifier IC1. The output terminal of amplifier IC1 is connected to the one terminal of resistor R21. Another terminal of resistor R21 is connected to the third terminal 3 of linear regulation switch S1 of the current sharing circuit 27. The non-inverting terminal of the amplifier IC1 is also connected to one terminal of resistor Rb, and become common terminal. This common terminal is connected to that of the other outputs and becomes current sharing bus. Another terminal of resistor Rb is connected to VCC.

The current sampling signal (VRs1, ..., VRsn) is connected in series with resistor (Rs1, ..., Rsn), and then connected to the current sharing bus, the voltage signal of current sharing bus is the average current signal of each outputs, Vshare=(VRs1+ ... VRsn)/n, and this average current signal will compare with the current sampling signal (VRs1, ..., VRsn) of each output. If the current of one output is smaller than the average current, the output voltage of the amplifier is at a high level, which makes linear regulation switch S1 saturate, when the current from the other outputs with larger output current is reduced gradually and the current of this output is increased automatically and reaches to average current. If the current of one output is larger than average current, the output voltage of the amplifier is gradually reduced, and makes linear regulation switch S1 operating at linear mode, the current of this output will be reduced and close to the average current. If the current of one output is equal to the average current, the output voltage of the amplifier will be high level because of the bias of resistor Rb, and then makes linear regulation switch S1 saturate. The lower the output voltage of the LED load 30, the lower the output voltage of the amplifier, the higher the voltage drop of linear regulation switch S1, and the more reduction of the current of the LED.

Figure 6:
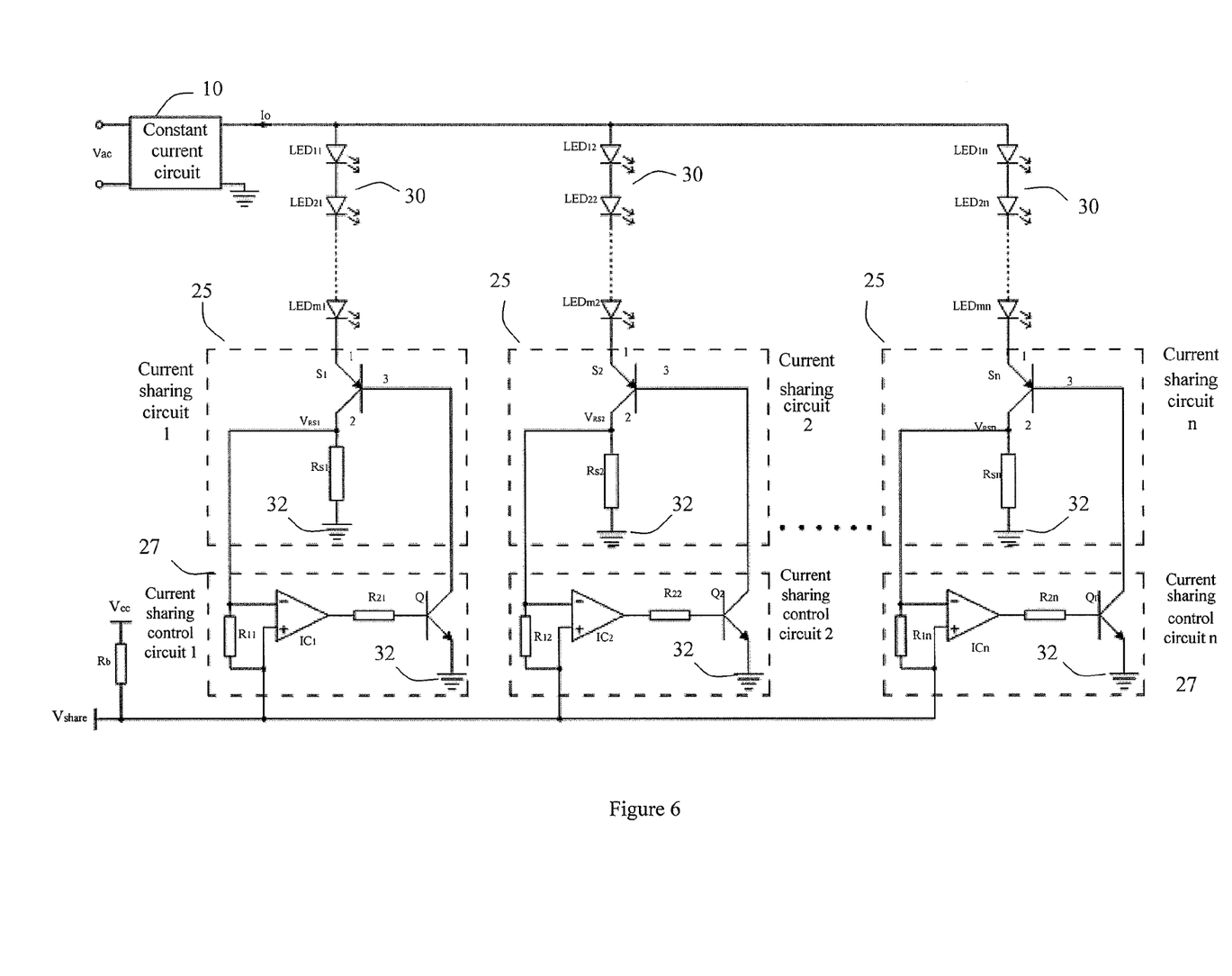
FIG. 6 depicts another diagram illustrating an exemplary embodiment of a circuit diagram of constant current control circuit with multiple outputs for led driver.

As shown in FIG. 6, the voltage Vac is the input voltage of constant current circuit 10, the output current of the constant current circuit (Io) feeds the current to each LED load 30. Each LED 30 load is comprises multiple serial LED strings with multiple outputs (namely LED11, LEDm1, ..., LED1n, ... LEDmn). Meanwhile, the first output (LED11, ..., LEDm1) is as an exemplary illustration of a single string.

The LED load (LED11, ..., LEDm1) 30 is connected in series and then connected to the current sharing circuit 25 composed by linear regulation switch S1 and sampling resistor Rs1. The first terminal 1 of the linear regulation switch (PNP transistor) S1 of the current sharing circuit 25 is connected to the LED load 30, and the second terminal 2 of linear regulation switch S1 is connected to one terminal of sampling resistor Rs1, another terminal of sampling resistor Rs1 is connected to the ground 32, and then connected to the output terminal of the constant current circuit 10.

The current sharing control circuit 27 comprises resistor R11, resistor R21, transistor Q1 and amplifier IC1. The inverting terminal of the amplifier IC1 of the current sharing control circuit 27 is connected to one terminal of sampling resistor Rs1, which is named as current sampling signal VRs1, and this signal is connected to one terminal of resistor R11, another terminal of resistor R11 is connected to the non-inverting terminal of the amplifier IC1. The output terminal of amplifier IC1 is connected to one terminal of resistor R21. Another terminal of resistor R21 is connected to the base terminal of transistor Q1, the emitter of transistor Q1 is connected to the ground, and the collector of transistor Q1 is connected to the third terminal 3 of linear regulation switch S1 of the current sharing circuit 25. The non-inverting terminal of the amplifier is also connected to one terminal of resistor Rb, and becomes the common terminal. This common terminal is connected to that of the other outputs and becomes current sharing bus. Another terminal of resistor Rb is connected to VCC.

The current sampling signal (VRs1, ..., VRsn) is connected in series with resistor (Rs1, ..., Rsn), and then connected to the current sharing bus, the voltage signal of current sharing bus is the average current signal of each outputs, Vshare=(VRs1+ ... VRsn)/n, and this average current signal will compare with the current sampling signal (VRs1, ..., VRsn) of each output. If the current of one output is smaller than the average current, the output voltage of the amplifier is high level, which makes linear regulation switch S1 saturate, when the current from the other outputs with larger output current is reduced gradually and the current of this output is increased automatically and reaches to the average current. If the current of one output is larger than the average current, the output voltage of the amplifier is gradually reduced, and makes linear regulation switch S1 operating at linear mode, the current of this output will be reduced and close to the average current. If the current of one output is equal to the average current, the output voltage of the amplifier IC1 will be high level because of the bias of resistor Rb, and then makes linear regulation switch S1 saturate. The lower the output voltage of the LED load, the lower the output voltage of the amplifier, the higher the voltage drop of linear regulation switch S1, and the more reduction of the current of the LED.

Figure 7:
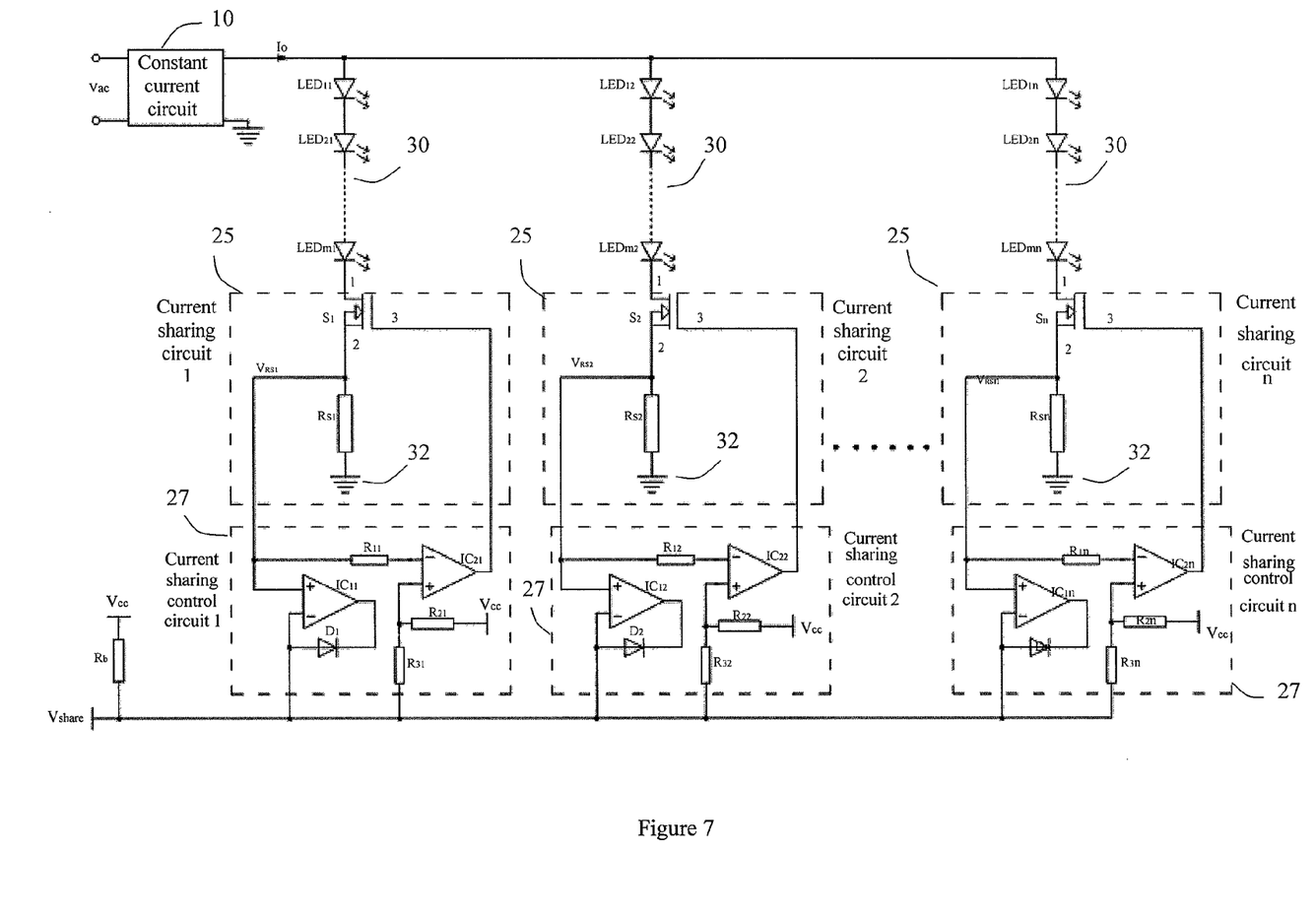
FIG. 7 depicts another diagram illustrating an exemplary embodiment of a circuit diagram of constant current control circuit with multiple outputs for led driver.

As shown in FIG. 7, the voltage Vac is the input voltage of constant current circuit 10, the output current of the constant current circuit (Io) feeds the current to each LED load 30. The LED load 30 comprises multiple serial LED strings with multiple outputs (namely LED11, ..., LEDm1, ..., LED1n, ..., LEDmn). Meanwhile, the first output (LED11, ..., LEDm1) is as an exemplary illustration. The LED load (LED11, ..., LEDm1) is connected in series and then connected to the current sharing circuit 25 which is composed by linear regulation switch S1 and sampling resistor Rs1.

The first terminal of linear regulation switch (MOSFET) S1 of the current sharing circuit 25 is connected to the LED load, and the second terminal of linear regulation switch S1 is connected to one terminal of sampling resistor Rs1, another terminal of sampling resistor Rs1 is connected to the ground 32, and then connected to the output terminal of the constant current circuit 10.

The current sharing control circuit 27 is comprised by resistor R11, resistor R21, resistor R31, transistor Q1 and amplifier IC11. The non-inverting terminal of amplifier IC11 of the current sharing control circuit 27 is connected to one terminal of sampling resistor Rs1, is named as current sampling signal VRs1, and this signal is connected to one terminal of resistor R11, another terminal of resistor R11 is connected to the inverting terminal of amplifier IC21. The inverting terminal of IC11 is connected to the anode of diode D1. The cathode of diode D1 is connected to the output terminal of amplifier IC11. The non-inverting terminal is connected to one terminal of resistor R21 and one terminal of resistor R31, another terminal of resistor R21 is connected to VCC. The output of amplifier IC21 is connected to the third terminal of linear regulation switch S1. The inverting terminal of amplifier IC11 is connected to another terminal of resistor R31 and one terminal of resistor Rb, and become common terminal. This common terminal is connected to that of the other outputs and becomes current sharing bus. Another terminal of resistor Rb is connected to VCC.

The current sampling signal (VRs1, . . . , VRsn) is transferred by amplifier IC11 and diode D1, and then connected to the current sharing bus, the voltage signal of current sharing bus is the minimum current signal of each outputs, Vshare=Min (VRs1, . . . , VRsn), and this minimum current signal will compare with the current sampling signal (VRs1, . . . , VRsn) of each output. If the current of one output is larger than the minimum current, the output voltage of the amplifier is reduced gradually, which makes linear regulation switch S1 operating at linear mode, the current of this output is reduced and close to the minimum current. If the current of one output is equal to the minimum current, the output voltage of the amplifier will be high level because of the bias of resistor (R21, . . . , R2n), and then makes linear regulation switch S1 saturate. The lower the output voltage of the LED load, the lower the output voltage of the amplifier, the higher the voltage drop of linear regulation switch S1, and the more reduction of the current of the LED. Those skilled in the art will readily recognize that the linear regulation switch S1 can be IGBT, and etc.

Figure 8:
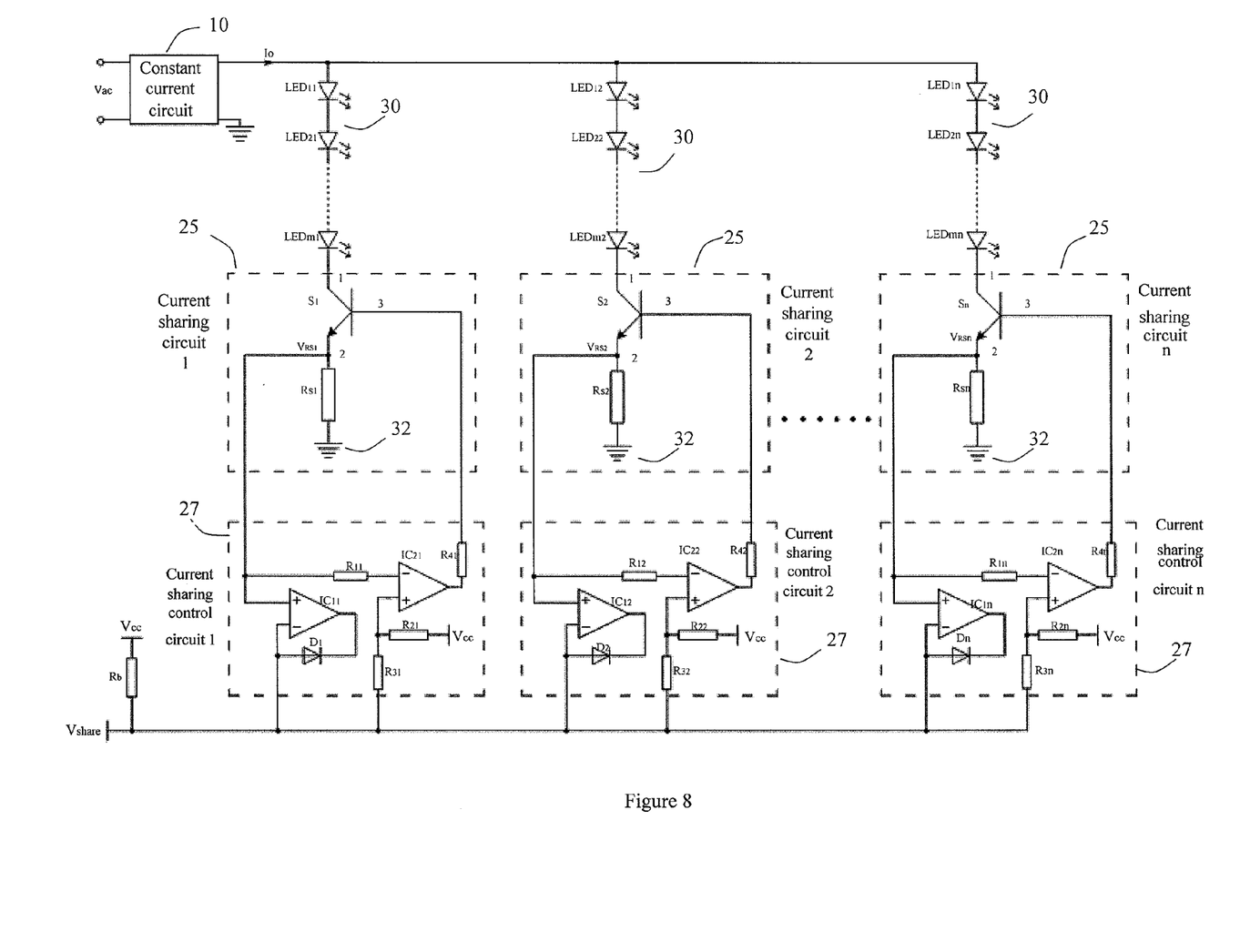
FIG. 8 depicts another diagram illustrating an exemplary embodiment of a circuit diagram of constant current control circuit with multiple outputs for led driver.

As shown in FIG. 8, the voltage Vac is the input voltage of constant current circuit, the output current of the constant current circuit (Io) feeds the current to each LED load. The LED load is composed by the multiple serried LED strings with multiple outputs (named as LED11, . . . , LEDm1, . . . , LED1n, . . . , LEDmn). Meanwhile, the first output (LED11, . . . , LEDm1) is an exemplary illustration.

The LED load (LED11, . . . , LEDm1) 30 is connected in series and then connected to the current sharing circuit 25 which is composed by linear regulation switch S1 and sampling resistor Rs1. The first terminal of linear regulation switch (NPN transistor) S1 of the current sharing circuit 25 is connected to the LED load, and the second terminal of linear regulation switch S1 is connected to one terminal of sampling resistor Rs1, another terminal of sampling resistor Rs1 is connected to the ground, and then connected to the output terminal of the constant current circuit.

The current sharing control circuit 27 comprises resistor R11, resistor R21, resistor R31, resistor R41, diode D1, amplifier IC11 and amplifier IC21. The non-inverting terminal of amplifier IC11 of the current sharing control circuit 27 is connected to one terminal of sampling resistor Rs1, which is named as current sampling signal VRs1, and this signal is connected to one terminal of resistor R11, another terminal of resistor R11 is connected to the inverting terminal of amplifier IC21. The inverting terminal of IC11 is connected to the anode of diode D1. The cathode of diode D1 is connected to the output terminal of amplifier IC11. The non-inverting terminal is connected to one terminal of resistor R21 and one terminal of resistor R31, another terminal of resistor R21 is connected to VCC. The output of amplifier IC21 is connected to one terminal of resistor R41, and another terminal of resistor R41 is connected to the third terminal of linear regulation switch S1. The inverting terminal of amplifier IC11 is connected to another terminal of resistor R31 and one terminal of resistor Rb, and becomes the common terminal. And this common terminal is connected to that of the other outputs and becomes current sharing bus. Another terminal of resistor Rb is connected to VCC.

The current sampling signal (VRs1, . . . , VRsn) is transferred by amplifier IC11 and diode D1, and then connected to the current sharing bus, the voltage signal of current sharing bus is the minimum current signal of each outputs, Vshare=Min (VRs1, . . . , VRsn), and this minimum current signal will compare with the current sampling signal (VRs1, . . . , VRsn) of each output. If the current of one output is larger than the minimum current, the output voltage of the amplifier is reduced gradually, which makes the linear regulation switch S1 operating at linear mode, the current of this output is reduced and close to the minimum current. If the current of one output is equal to the minimum current, the output voltage of the amplifier will be at a high level because of the bias of resistor (R21, . . . , R2n), and then makes linear regulation switch S1 saturate. The lower the output voltage of the LED load, the lower the output voltage of the amplifier, the higher the voltage drop of linear regulation switch S1, and the more reduction of the current of the LED.

Figure 9:
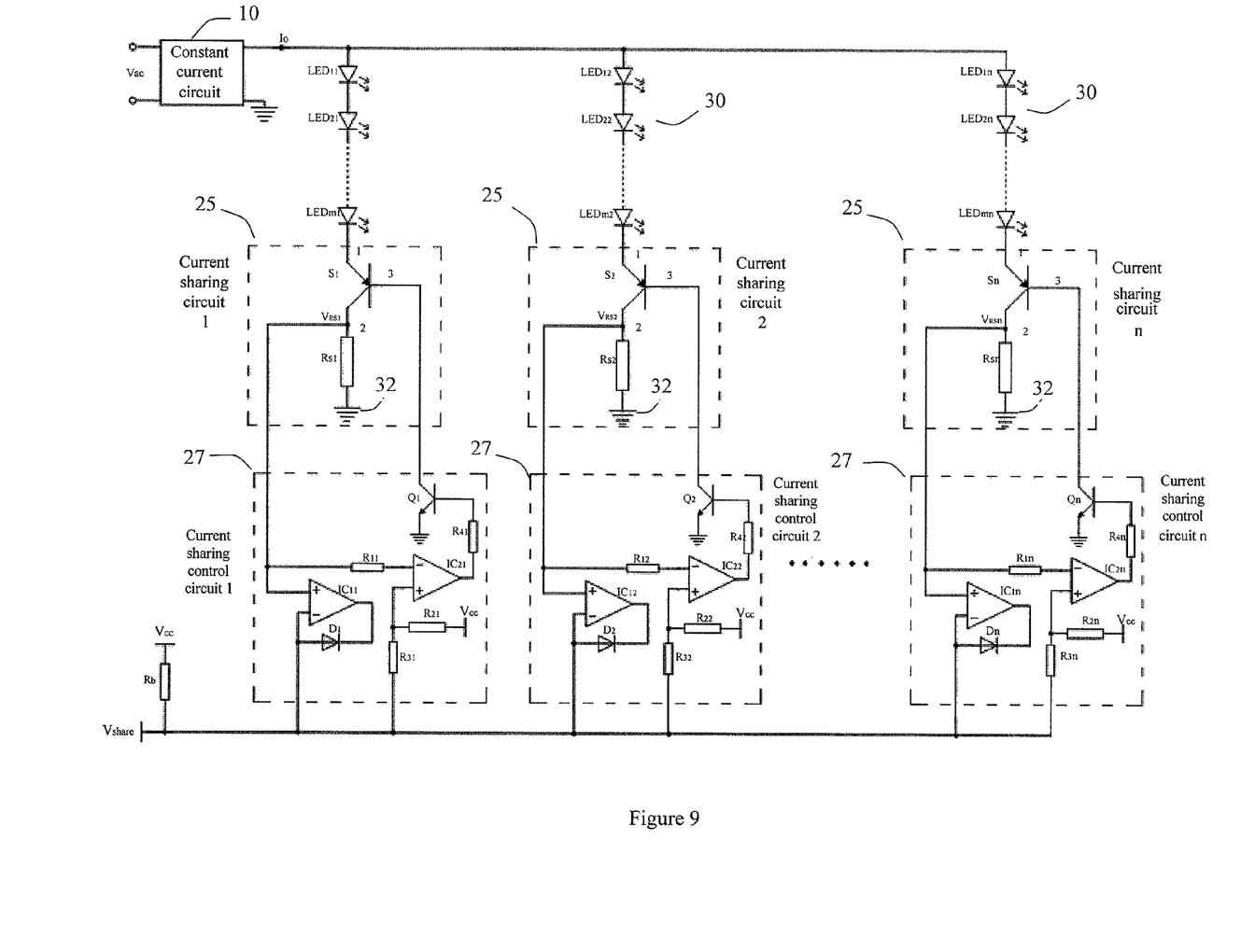
FIG. 9 depicts yet another diagram illustrating an exemplary embodiment of a circuit diagram of constant current control circuit with multiple outputs for led driver.

As shown in FIG. 9 the voltage Vac is the input voltage of constant current circuit, the output current of the constant current circuit (Io) feeds the current to each LED load. The LED load is composed by the multiple serried LED strings with multiple outputs (namely LED11, . . . , LEDm1, . . . , LED1n, . . . , LEDmn). Meanwhile, the first output (LED11, . . . LEDm1) is an exemplary illustration.

The LED load (LED11, . . . , LEDm1) is connected in series and then connected to the current sharing circuit 1 composed by linear regulation switch S1 and sampling resistor Rs1. The first terminal of linear regulation switch (PNP transistor) S1 of the current sharing circuit 25 is connected to the LED load, and the second terminal of linear regulation switch S1 is connected to one terminal of sampling resistor Rs1, another terminal of sampling resistor Rs1 is connected to the ground, and then it is connected to the output terminal of the constant current circuit.

The current sharing control circuit 27 is comprised by resistor R11, resistor R21, resistor R31, resistor R41, transistor Q1, diode D1, amplifier IC11 and amplifier IC21. The non-inverting terminal of amplifier IC11 of the current sharing control circuit 27 is connected to one terminal of sampling resistor Rs1, which is named as current sampling signal VRs1, and this signal is connected to one terminal of resistor R11, another terminal of resistor R11 is connected to the inverting terminal of amplifier IC21. The inverting terminal of IC11 is connected to the anode of diode D1. The cathode of diode D1 is connected to the output terminal of amplifier IC11. The non-inverting terminal is connected to one terminal of resistor R21 and one terminal of resistor R31, another terminal of resistor R21 is connected to VCC. The output of amplifier IC21 is connected to one terminal of resistor R41, and another terminal of resistor R41 is connected to the base of transistor Q1, the emit of transistor Q1 is connected to the output ground, the collector of transistor Q1 is connected to the third terminal of linear regulation switch S1. The inverting terminal of amplifier IC11 is connected to another terminal of resistor R31 and one terminal of resistor Rb, and becomes the common terminal. And this common terminal is connected to that of the other outputs and becomes current sharing bus. Another terminal of resistor Rb is connected to VCC.

The current sampling signal (VRs1, ... VRsn) is transferred by amplifier IC11 and diode D1, and then connected to the current sharing bus, the voltage signal of current sharing bus is the minimum current signal of each outputs, Vshare=Min (VRs1, ..., VRsn), and this minimum current signal will compare with the current sampling signal (VRs1, ..., VRsn) of each output. If the current of one output is larger than the minimum current, the output voltage of the amplifier is reduced gradually, that makes linear regulation switch S1 operating at linear mode, the current of this output is reduced and close to the minimum current. If the current of one output is equal to the minimum current, the output voltage of the amplifier will be high level because of the bias of resistor (R21, ..., R2n), and then makes linear regulation switch S1 saturate. The lower the output voltage of the LED load, the lower the output voltage of the amplifier, the higher the voltage drop of linear regulation switch S1, and the more reduction of the current of the LED.

It should be understood that the above mentioned embodiments are just the illumination of the present invention, but not limited to the invention. All extended solutions or substitutions based on the principle and content of this invention should be regarded as Inventors' claims to be protected. Also though the above descriptions are focused on the current sharing circuit and current sharing control circuit of a lead string of a LED load, what is disclosed is applicable to the other current sharing circuits and current sharing control circuits illustrated as well.

Furthermore, while the invention has been described with reference to various exemplary embodiments, it will be understood by those skilled in the art that various changes, omissions and/or additions may be made and equivalents may be substituted for elements thereof without departing from the spirit and scope of the invention. In addition, many modifications may be made to adapt a particular situation or material to the teachings of the invention without departing from the scope thereof. Therefore, it is intended that the invention not be limited to the particular embodiment disclosed as the best mode contemplated for carrying out this invention, but that the invention will include all embodiments falling within the scope of the appended claims. Moreover, unless specifically stated, any use of the terms first, second, etc., do not denote any order or importance, but rather the terms first, second, etc., are used to distinguish one element from another.

What is claimed is:

1. A constant current control circuit with multiple outputs for an LED driver, the circuit comprising:
    a single-output constant current power supply; and
    multiple output circuits, each output circuit comprising:
        a current sharing circuit,
        a current sharing control circuit and an LED load, the LED load and the current sharing circuit are in series and form a series loop with a first terminal and a second terminal of the series loop connected to a first output terminal and a second output terminal of the constant current power supply;
    wherein the current sharing circuit further comprises a current sampling resistor and a linear regulator with an output of the current sharing circuit connected with an input terminal of the current sharing control circuit and with an input signal of each current sharing control circuit connected to an output current sampling signal of the respective sampling resistor;
    wherein a common terminal of each current sharing control circuit is connected together to form a current sharing bus, and each current sampling signal and the current sharing bus signal representing an average current signal derived from a node of the current sharing bus are compared and adjusted, without input of an external reference voltage, through the current sharing control circuit so that the output signal of the corresponding current sharing control circuit can control an impedance of the linear regulator, and then control the current of each output to make sure the current output by each circuit is equivalent to one another; and
    wherein the current sharing control circuit comprises an amplifier with a positive input terminal of the amplifier connected with a current sharing bus and a resistor in series, and then connected with its negative input terminal of the amplifier and the sampling terminal of sampling resistor, the output terminal of the amplifier is connected with the control terminal of the linear regulator directly or by connecting with an output resistor in series.

2. The circuit according to claim 1, wherein the linear regulator is a MOSFET, transistor, and/or an IGBT.

3. A constant current control circuit with multiple outputs for an LED driver, the circuit comprising:
    a single-output constant current power supply; and
    multiple output circuits, each output circuit comprising:
        a current sharing circuit,
        a current sharing control circuit and an LED load, the LED load and the current sharing circuit are in series and form a series loop with a first terminal and a second terminal of the series loop connected to a first output terminal and a second terminal of the constant current power supply;
    wherein the current sharing circuit further comprises a current sampling resistor and a linear regulator with an output of the current sharing circuit connected with an input terminal of the current sharing control circuit and with an input signal of each current sharing control circuit connected to an output current sampling signal of the respective sampling resistor;
    wherein a common terminal of each current sharing control circuit is connected together to form a current sharing bus, and each current sampling signal and the current sharing bus signal representing an average current signal derived from a node of the current sharing bus are compared and adjusted, without input of an external reference voltage, through the current sharing control circuit so that the output signal of the corresponding current sharing control circuit can control an impedance of the linear regulator, and then control the current of each output to make sure the current output by each circuit is equivalent to one another;
    wherein the current sharing control circuit comprises two amplifiers, three resistors, and a diode; and wherein an cathode of the diode is connected with an output terminal of the first amplifier, an end of the first resistor is connected with a negative terminal of the second amplifier, and the positive terminal of the second amplifier is connected with one end of the second resistor and an end of the third resistor.

4. A constant current control circuit with multiple outputs for an LED driver, the circuit comprising:
a single-output constant current power supply and
multiple output circuits, each output circuit comprising:
a current sharing circuit,
a current sharing control circuit and an LED load, the LED load and the current sharing circuit are in series and form a series loop with a first terminal and a second terminal of the series loop connected to a first output terminal and a second out terminal of the constant current power supply;
wherein the current sharing circuit further comprises a current sampling resistor and a linear regulator with an output of the current sharing circuit connected with an input terminal of the current sharing control circuit and with an input signal of each current sharing control circuit connected to an output current sampling signal of the respective sampling resistor;
wherein a common terminal of each current sharing control circuit is connected together to form a current sharing bus, and each current sampling signal and the current sharing bus signal representing an average current signal derived from a node of the current sharing bus are compared and adjusted, without input of an external reference voltage, through the current sharing control circuit so that the output signal of the corresponding current sharing control circuit can control an impedance of the linear regulator, and then control the current of each output to make sure the current output by each circuit is equivalent to one another, and
wherein the current sharing control circuit comprises two amplifiers, four resistors, a diode, and a transistor; and
wherein a cathode of the diode is connected with an output terminal of the first amplifier, and an end of the first resistor is connected with a negative terminal of the second amplifier.

5. A constant current control circuit with multiple outputs for an LED driver, the circuit comprising:
a single-output constant current power supply; and
multiple output circuits, each output circuit comprising:
a current sharing circuit,
a current sharing control circuit and an LED load, the LED load and the current sharing circuit are in series and form a series loop with a first terminal and a second terminal of the series loop connected to a first output terminal and a second output terminal of the constant current power supply;
wherein the current sharing circuit further comprises a current sampling resistor and a linear regulator with an output of the current sharing circuit connected with an input terminal of the current sharing control circuit and with an input signal of each current sharing control circuit connected to an output current sampling signal of the respective sampling resistor
wherein a common terminal of each current sharing control circuit is connected together to form a current sharing bus, and each current sampling signal and the current sharing bus signal representing an average current signal derived from a node of the current sharing bus are compared and adjusted, without input of an external reference voltage through the current sharing control circuit so that the output signal of the corresponding current sharing control circuit can control an impedance of the linear regulator, and then control the current of each output to make sure the current output by each circuit is equivalent to one another; and
wherein the current sharing control circuit comprises two amplifiers, four resistors, a diode, and a transistor; and
wherein a positive terminal of the second amplifier is connected with an end of the second resistor and an end of the third resistor, and an end of the second resistor is connected with a power source.

6. A constant current control circuit with multiple outputs for an LED driver, the circuit comprising:
a single-output constant current power supply; and
multiple output circuits, each output circuit comprising:
a current sharing circuit,
a current sharing control circuit and an LED load, the LED load and the current sharing circuit are in series and form a series loop with a first terminal and a second terminal of the series loop connected to a first output terminal and a second output terminal of the constant current power supply;
wherein the current sharing circuit further comprises a current sampling resistor and a linear regulator with an output of the current sharing circuit connected with an input terminal of the current sharing control circuit and with an input signal of each current sharing control circuit connected to an output current sampling signal of the respective sampling resistor;
wherein a common terminal of each current sharing control circuit is connected together to form a current sharing bus, and each current sample signal and the current sharing bus signal representing an average current signal derived from a node of the current sharing bus are compared and adjusted, without input of an external reference voltage, through the current sharing control circuit so that the output signal of the corresponding current sharing control circuit can control an impedance of the linear regulator, and then control the current of each output to make sure the current output by each circuit is equivalent to one another; and
wherein the current sharing control circuit comprises two amplifiers, four resistors, a diode, and a transistor; and
wherein an output terminal of the second amplifier is connected with an end of the fourth resistor, and a second end of the fourth resistor is connected with a base of the transistor.

7. The circuit according to claim 3, wherein the linear regulator is a MOSFET, transistor, and/or an IGBT.

8. The circuit according to claim 4, wherein the linear regulator is a MOSFET, transistor, and/or an IGBT.

9. The circuit according to claim 5, wherein the linear regulator is a MOSFET, transistor, and/or an IGBT.

10. The circuit according to claim 6, wherein the linear regulator is a MOSFET, transistor, and/or an IGBT.

* * * * *